Patented Mar. 27, 1934

1,952,289

UNITED STATES PATENT OFFICE 1,952,289

PROCESS OF EXTRACTING SALTS FROM MINERALS

Eugene P. Schoch, Austin, Tex.

No Drawing. Application April 11, 1932, Serial No. 604,662

19 Claims. (Cl. 23—128)

This invention relates to the extraction of salts from minerals and more particularly has reference to a process of obtaining calcium sulphate, magnesium sulphate, and potassium sulphate in substantially pure form from minerals containing the same individually or collectively.

It is well known that polyhalite, a mineral with a composition expressed by the chemical formula $$2CaSO_4, MgSO_4, K_2SO_4, 2H_2O$$

when put in contact with water allows its soluble constituents, e. g. magnesium sulphate and potassium sulphate, to dissolve only very slowly even though the mineral may be ground up very fine; with cold water a day or two will be required, and even with hot water four hours or more are required. Furthermore the solution of potassium sulphate thus obtained will be very dilute, because the residual calcium sulphate from the polyhalite recombines with potassium sulphate if the latter exceeds certain limits. At 31.8° C. this limit is a solution containing only 3.5% of potassium sulphate, and at 100° C., only 1%. Hence it is that the direct extraction of potassium sulphate from polyhalite is commercially uneconomical. Various attempts have been made heretofore to overcome this difficulty but with results that have not been found entirely successful.

For example, ore has been heated to expel its water of crystallization, and to "dead burn" the calcium sulphate so that it will not react with, or dissolve in, hot water until after the lapse of enough time to dissolve all of the potassium sulphate (and magnesium sulphate) with the formation of concentrated solutions. This procedure involves the expense of a furnace installation and a relatively long roasting operation such as one hour or more. Furthermore, the roasted material must be boiled in water for an hour or more to dissolve the soluble salts because the roasting action has affected these so that they dissolve very slowly. Another process, which is set forth in my copending application for U. S. Letters Patent filed September 19, 1931 under the Serial No. 563,899 and entitled Process of treating polyhalite, avoids roasting but requires the use of lime under special conditions which makes it possible to obtain all of the potassium sulphate in the form of an 8% solution.

This application is directed to the discovery of a method of extracting potassium sulphate from polyhalite which avoids not only the roasting but which also avoids the use of any chemical, and consists simply of heating a mixture of the ground polyhalite with water or with a dilute solution of potassium sulphate in a closed vessel to a temperature between 200° and 210° C. for about an hour, as a result of which the solid is so changed as to yield, with a properly designed leaching procedure, its content of potassium sulphate in the form of a fairly concentrated (say 6.8% up to 10%) solution, and while dissolving only a fraction (one-half or less) of its total content of magnesium sulphate.

This process rests fundamentally first on the newly discovered fact that by this treatment the solubility of magnesium sulphate in water is reduced so that only 5.2 to 8.5% of it remains in solution at 204° C. The lowest published solubility of magnesium sulphate is that of Etard, in Annales dechimie et de physique (7) 2, 551 (1894), who found the solubilities to be at 164° C.:29.3% MgSO$_4$
at 188° C.:20.3% MgSO$_4$ The solid in contact with these solutions is kieserite MgSO$_4$.H$_2$O, a crystalline substance which dissolves very slowly in water at ordinary temperatures.

I have found that solutions containing only magnesium sulphate, and this in amounts exceeding 8.5%, when heated in a closed vessel to 204° C. for about an hour, will leave only 8.5% MgSO$_4$ in solution and deposit the excess in the form of kieserite. When heated to 204° C. in the presence of ground gypsum—in amount equivalent to the MgSO$_4$ present—then the solution retained only 6.5% MgSO$_4$. If furthermore the solution also contains potassium sulphate, then the solubility of MgSO$_4$ is reduced still more provided the per cent of K$_2$SO$_4$ in solution does not exceed 7.5%; with the latter amount, the solubility of MgSO$_4$ is reduced to 5.2%, but with larger concentrations of K$_2$SO$_4$ the formation of kieserite appears to be hindered; thus solutions containing equal per cents of both ranging from 10% to 18% did not undergo any change when heated to 204° C.

The second newly discovered fact which this process involves is this: when calcium sulphate is mixed with equivalent amounts of potassium sulphate (or with less) and with some water, and the mixture is heated to 204° C., and the resulting solid is subjected to successive leaching operations first with hot, then with cold solutions of water, it is found that solutions with maximum concentrations of 8 to 9% K$_2$SO$_4$ are obtainable, while in the end all of the K$_2$SO$_4$ is readily extractable. The procedure and the results obtained do not differ essentially from those described below in which polyhalite is used except that the latter also involves magnesium sulphate. Hence further details need not be given here.

However, it should be realized that the above shows the following: while the ingredients—$K_2SO_4$ and $CaSO_4.2H_2O$ and water—are mixed and heated at temperatures below 100° C., there occurs formation of the well known compounds:

Syngenite, $CaSO_4, K_2SO_4, H_2O$
Pentasalt, $5CaSO_4, K_2SO_4, H_2O$.

But the easy and complete extractibility of the $K_2SO_4$ from the mass after it was heated to 204° C. indicates that these two compounds have been changed just as polyhalite is changed by this treatment, because if syngenite were still present, its decomposition with hot water would produce some pentasalt, and the latter, as well as any other pentasalt still present in the mixture, would decompose much slower with cold water than the solid residues left from heating to 204° C. It is immaterial here to know in what form the potassium sulphate is present in this solid residue left from heating the mixture at 204° C.; the essential and new fact that I have discovered and am making use of is that this potassium sulphate may be readily extracted completely from this residue while it cannot be thus extracted from masses containing pentasalt or syngenite which have not been thus heated to high temperatures. In order to show definitely the kind of results obtained, I present next the details of operation and results obtained in two trials with polyhalite.

*First trial*

250 grams of finely ground polyhalite were mixed with 200 grams of a solution containing 5% of potassium sulphate and put into a strong closed vessel or bomb fitted with a thermometer well and a steam pressure gauge. The mixture was heated up until the gauge showed 225 to 230 lbs. of gauge pressure, and the thermometer showed 202 to 204° C. The vessel with its contents was kept at this pressure and temperature for one hour. It was then cooled fairly rapidly (in 10 minutes) to a temperature of about 100° C., the vessel opened, and a sample of the liquid was tested and found to contain 6.% of $K_2SO_4$ and 3% of $MgSO_4$. The whole mixture was then mixed with 690 grams of a hot solution containing 6.5% of $K_2SO_4$, and the mixture stirred for about 10 minutes while its temperature was maintained near the boiling point. It was then filtered, and yielded 815 grams of a solution containing 8% of $K_2SO_4$ and 1.3% $MgSO_4$. The filter cake was then mixed with 720 grams of a hot solution containing 5% of $K_2SO_4$ and stirred with this—while kept hot—for about 10 minutes, and on filtering it yielded 720 grams of a solution containing 6.1% of $K_2SO_4$. The filter cake was then mixed with 900 grams of solution containing 3% $K_2SO_4$, and this mixture stirred for 6 hours in a water thermostat at 32° C. On filtering, this yielded about 900 grams of a solution containing 4.9% $K_2SO_4$. Finally, the filter cake was mixed with 950 grams of distilled water, and stirred for 18 hours at 32° C. and on filtering, it yielded about 900 grams of a solution containing 2.9% $K_2SO_4$. The residue was washed with a total of 300 grams of water, which afterwards contained ⅔% of $K_2SO_4$, and left the residue free of potash.

The following tabular arrangement presents the various quantities of potash involved:

|   |   | Grams $K_2SO_4$ |   |
|---|---|---|---|
| 1. | 250 grams of polyhalite at 27.3% | 68.2 |   |
| 2. | The 815 grams of 8% solution obtained contain | 65.2 |   |
| 3. | The liquids used for the above extraction contained: |   |   |
|   | 200 grams of 5% solution | 10.0 |   |
|   | 690 grams of 6.5% solution | 44.8 |   |
| 4. | Total contributed by these solutions | 54.8 |   |
| 5. | Actual amount taken from solid by 8% solution: item (2) minus item (4) | 10.4 |   |
| 6. | The 720 grams of 5% solution used for the extraction contained | 36.0 |   |
| 7. | The 720 grams of filtrate with 6.1% of $K_2SO_4$ contained | 43.8 |   |
| 8. | Actual amount taken from solid cake by 6.1% solution | 7.8 |   |
| 9. | Total removed from the solid by the hot extractions so far or 26.8% of total | 18.2 |   |
| 10. | The 900 grams of 3% solution then used at 32° C. contained | 27.0 |   |
| 11. | The 900 grams of 4.9% solution obtained from this contained | 44.1 |   |
| 12. | Amount extracted by the 3% solution | 16.9 |   |
| 13. | The 900 grams of water which yielded about 900 grams of 2.9% solution extracted | 26.1 |   |
| 14. | The 300 cc. of wash water at ⅔% removed | 2.0 |   |
| 15. | Total obtained by extractions: |   |   |
|   | 18.2 |   |   |
|   | 16.9 |   |   |
|   | 26.1 |   |   |
|   | 2.0 |   |   |
|   | 63.2 | 63.2 |   |

Unaccounted for 5.0 grams.

Since the primary purpose of this procedure was to show that the potash was extractible so as to produce solutions of the highest concentrations directly obtainable, no attempt was made to collect traces by rinsing, etc., and hence small quantities were unavoidably lost throughout the whole series of operations. In view of this, a recovery of 63 grams out of 68 grams may be considered to account satisfactorily for the quantities involved and extracted at the various steps.

*Second trial*

250 grams of finely ground polyhalite were mixed with 250 grams of a solution containing 5% of potassium sulphate and the mixture heated for 30 minutes in a closed vessel or bomb at 210° C. After cooling the vessel to 100° C. and opening it, it was found that a filtered sample of the liquid contained 6% of potassium sulphate. Then 729 grams of a solution containing 5% of $K_2SO_4$ were added to the above mixture, and the whole boiled for 10 minutes. The resulting, filtered solution contained 6.8% of potassium sulphate, and 1.3% of magnesium sulphate ($MgSO_4$).

The 250+729=979 grams of 5% solution contained 49 grams of $K_2SO_4$ and 930 grams of water. Since the resulting mixture contained 6.8% $K_2SO_4$, the amount of potassium sulphate dissolved therein is 68 grams $K_2SO_4$. Hence this 5% solution has extracted 68 minus 49 or 19 grams out of 68.2 grams, or 27.8% of the whole, which agrees with the per cent extracted by the hot solutions in the first trial.

The remaining extractions were made as before and yielded essentially the same results namely, 900 grams of a 3% solution were raised to a 5% solution, and then 900 grams of water were raised to a 3% solution, and after washing the cake was free from potash.

Thus it is evident that such a series of extractions can remove all the potash and produce a solution containing from 6.8 to 8% of potash. The simultaneously accumulated amount of magnesium sulphate amounts to about 2.3% in the final most concentrated solution of potassium sulphate. This is about 47% of the total magnesium sulphate in the polyhalite. Since polyhalite heated with a relatively small amount of water (as in the two trials above described) forms in the bomb a solution containing generally 6% $K_2SO_4$ with only 3.3% $MgSO_4$, and since during subsequent leaching operations the $MgSO_4$ remains relatively insoluble while the potassium sulphate dissolves readily, it is believed that this heating operation breaks up the polyhalite and changes the $MgSO_4$ to the insoluble form, kieserite, $MgSO_4, H_2O$.

Concerning the effect of this heating operation upon the potassium sulphate in the polyhalite, it should be pointed out that about 27% of it appears to be so changed that solutions containing more than 5% $K_2SO_4$ may be enriched thereby—even to a total concentration above 8%. The remainder of the potassium sulphate shows the remarkable property of being readily and completely extractible with cool water or cold solutions so that the total remainder may be collected to form a 5% solution.

As already discussed above, this behavior is at variance with the properties of the two calcium-potassium double sulphates which are formed at and below 100° C., namely:

Syngenite, $K_2SO_4, CaSO_4, H_2O$
Pentasalt, $5CaSO_4, K_2SO_4, H_2O$

If these were formed in my heating operation, then about 3/5 of the total $K_2SO_4$ should be extractible hot to form solutions containing from 5% to 8% $K_2SO_4$, but only about half as much has been found by me to be thus extractible.

Again, if pentasalt is formed, then about 2/5 of the potash should be thus tied up, and this should be very slowly extractible, and not be able to form a solution richer than 3.5% at 32° C. The ready extractibility of all the $K_2SO_4$ indicates that pentasalt is absent. Hence I conclude that the $K_2SO_4$ which remains in the polyhalite after the heating operation is present in some form or forms different from syngenite or pentasalt.

It is evident that the above newly discovered facts together with other already known facts make it possible to separate polyhalite into potassium sulphate, magnesium sulphate, and calcium sulphate by the following new simple and economical procedure.

Ground polyhalite is mixed with enough water—or better with a dilute solution of potassium sulphate—to form a fairly liquid mass. I found it suitable to use equal weights of ground polyhalite and of a solution containing about 5% of $K_2SO_4$, and a small amount (say 1%) of $MgSO_4$. The mixture is heated in a closed vessel to about 204° C. for one hour, is cooled to 100° C., and is then mixed with as much more of a dilute solution of $K_2SO_4$ as will allow the mixture to attain a concentration from 6.8 to 8% $K_2SO_4$, or more. The $MgSO_4$ concentration will probably be about 2 to 2.5%. This solution is filtered or clarified by settling and is then evaporated, as a result of which $K_2SO_4$ will crystallize out until the concentrations of $K_2SO_4$ and $MgSO_4$ are approximately equal. The remaining mixture might then be separated by fractional crystallization. I prefer, however, to proceed as follows:

I cool this solution to 32° C. or below, and add gypsum to it in such proportion as is necessary to form syngenite, until the $K_2SO_4$ concentration has been reduced to 3.5% or less. Then I heat the filtered solution in a closed vessel to 204° C. thus reducing the $MgSO_4$ to 8.5% and obtaining a crop of kieserite crystals. The solution may then be evaporated to concentrate it, then the $K_2SO_4$ concentration may again be reduced with gypsum, and the $MgSO_4$ concentration in turn reduced by heating to 204° C., and by a suitable repetition of these procedures, all of this $K_2SO_4$ will finally be obtained as syngenite, and all of this $MgSO_4$ obtained as kieserite. The syngenite is then heated to 204° C. with water or $K_2SO_4$ solution, whereupon it is decomposed just like polyhalite. Hence, eventually, all of the $K_2SO_4$ is obtained by itself in crystalline form.

The solid residue left from treating the decomposed polyhalite with a hot solution containing 5% $K_2SO_4$ is next leached out with water by the well known "counterflow" plan, as a result of which is a solution of about 5% $K_2SO_4$ and 1% $MgSO_4$ may be obtained at one end, and a potash-free solid residue of gypsum and kieserite is obtained at the other. The solution containing 5% $K_2SO_4$ is used in treating further portions of polyhalite.

The solid residue of gypsum and kieserite is then heated with water, and kept at 100° C. for several hours, as a result of which the kieserite is dissolved, and can be obtained as Epsom salts by evaporating and cooling this liquid. The calcium sulphate may then be further worked up into wall plaster.

It is obvious that those skilled in the art may vary the steps and combinations of steps constituting the process without departing from the spirit of the invention, and therefore it is not desired to be limited to the foregoing except as may be required by the claims.

What is claimed it:—

1. The process of separating magnesium sulphate from a solution containing it together with 7½% or less of potassium sulphate, the amount of magnesium sulphate in said solution being above that quantity which inevitably remains in solution, which consists in heating the solution in a closed vessel for a time and at a temperature above 200° C. to precipitate as much of the magnesium sulphate as will leave a solution containing 8½% or less of magnesium sulphate; and separating the liquid from the solid.

2. The process of separating magnesium sulphate from a solution containing it together with 7½% or less of potassium sulphate, the amount of magnesium sulphate in said solution being above that quantity which inevitably remains in solution, which consists in heating the solution in a closed vessel for an hour at a temperature between 200-210° C. to precipitate as much of the magnesium sulphate as will leave a solution containing 8½% or less of magnesium sulphate; and separating the liquid from the solid.

3. The process of extracting potassium sulphate from any of its compounds with calcium sulphate from which it can be extracted only with difficulty which consists in forming a mixture of the ground compound with water, heating said mixture in a closed vessel for a time and at a temperature above 200° C. to render the potassium sulphate extractible, and recovering the potassium sulphate.

4. The process of extracting potassium sulphate from any of its compounds with calcium sulphate from which it can be extracted only with difficulty which consists in forming a mixture of the ground compound with water, heating said mixture in a closed vessel for substantially an hour and at a temperature substantially of the range 200-210° C. to render the potassium sulphate extractible, and recovering the potassium sulphate.

5. The process of producing potassium sulphate which consists in forming a mixture of water and raw or ineffectively calcined polyhalite; heating said mixture in a closed vessel to a temperature substantially of the range 200-210° C. for a time and sufficient to render the contained potassium sulphate readily extractible; and recovering the potassium sulphate.

6. The process of producing potassium sulphate which consists in forming a mixture of raw or ineffectively calcined polyhalite and a dilute solution of potassium sulphate and magnesium sulphate; heating said mixture in a closed vessel for substantially an hour at a temperature between 200-210° C. to render the contained potassium sulphate readily extractible; and recovering the potassium sulphate by bleaching and evaporation.

7. The process of recovering potassium sulphate from raw or ineffectively calcined polyhalite which consists in mixing this finely ground polyhalite with approximately an equal weight of a solution containing 3 to 5% of potassium sulphate; heating said mixture in a closed vessel for about ½ to 1 hour at a temperature of 200 to 210° C.; cooling said mixture to substantially 100° C., adding more of the dilute solution in amount 2 to 3 times that first used, boiling and stirring the mixture for about half an hour, and filtering; adding to the solid about the same amount of a more dilute solution of potassium sulphate and boiling and stirring and finally filtering the mixture; then adding a correspondingly suitable quantity of a still more dilute solution of potassium sulphate to extract the solid without heating, and finally extracting the solid with cool water until it is free from potassium sulphate; and recovering the potassium sulphate from the various filtrates.

8. The process of recovering potassium sulphate, magnesium sulphate and calcium sulphate which consists of mixing raw or ineffectively calcined polyhalite with water or with a dilute solution of potassium sulphate, heating this mixture to a temperature between 200 to 210° C. for ½ to 1 hour, cooling the mixture to 100° C.; leaching the solid with more of a dilute solution of potassium sulphate in order to obtain a solution containing 6.8 to 8% potassium sulphate; then leaching the solid residue in turn with a more dilute but cool solution of potassium sulphate and finally with water until all of the potassium sulphate has been extracted; evaporating the most concentrated solution as far as possible to obtain a crystal crop composed of only potassium sulphate, and filtering; adding gypsum to this filtrate in such proportion as to form syngenite and filtering; heating this filtrate in a closed vessel to substantially 204° C. to obtain kieserite in crystallized form; filtering and evaporating the filtrate and treating this again alternately with gypsum to remove the potassium sulphate and by heating to 204° to remove more kieserite; evaporating all the potassium sulphate solutions to crystallization; and mixing water with the kieserite and also the solid residue left from the polyhalite and heating this mixture in order to hydrate and dissolve the kieserite, filtering to remove the calcium sulphate, and cooling the liquid to obtain crystals of Epsom salts.

9. The process of recovering potassium sulphate from raw or ineffectively calcined polyhalite which consists in mixing 250 grams of finely ground polyhalite with a solution containing 5% of potassium sulphate; heating said mixture in a closed vessel for one hour at a temperature of 202-204° C. under a gauge pressure of 225-230 pounds; cooling said solution to substantially 100° C., adding 690 grams of a hot solution containing 6.5% of potassium sulphate, stirring while maintaining the temperature of the mixture near the boiling point; filtering and stirring the filter cake with 720 grams of a hot solution containing 5% of potassium sulphate; filtering and stirring the filter cake with 900 grams of a solution containing 3% of potassium sulphate while maintaining a temperature of substantially 32° C.; filtering and stirring the filter cake with 950 grams of distilled water at 32° C.; filtering and washing the residue free from potash with 300 grams of water; and recovering the potassium sulphate from the various filtrates.

10. The process of recovering potassium sulphate from raw or ineffectively calcined polyhalite which consists in mixing 250 grams of finely ground polyhalite with 250 grams of a solution containing 5% of potassium sulphate; heating said mixture in a closed vessel for thirty minutes at a temperature of 210° C.; cooling said mixture to substantially 100° C., adding 729 grams of a solution containing 5% of potassium sulphate, and maintaining the temperature of the mixture near the boiling point for ten minutes; filtering and stirring the filter cake with 720 grams of a hot solution containing 5% of potassium sulphate; filtering and stirring the filter cake with 900 grams of a solution containing 3% of potassium sulphate while maintaining a temperature of substantially 32° C.; filtering and stirring the filter cake with 950 grams of distilled water at 32° C.; filtering and washing the residue free from potash with 300 grams of water; and recovering the potassium sulphate from the various filtrates.

11. The process of treating soluble mixtures of magnesium sulphate and potassium sulphate not readily separable into their two components which consists in heating the mixture to a temperature substantially of the range 200-210° C. in a closed vessel in the presence of water to change the magnesium sulphate to an insoluble form while leaving the potassium sulphate in readily soluble form.

12. The process of treating insoluble mixtures of calcium sulphate and potassium sulphate which consists in heating the mixture to a temperature substantially of the range 200-210° C. in a closed vessel in the presence of water to leave the calcium sulphate in an insoluble form and to change the potassium sulphate to a readily soluble form.

13. The process of treating insoluble mixtures of calcium sulphate, magnesium sulphate and potassium sulphate which consists in heating the mixture to a temperature substantially of the range 200–210° C. in a closed vessel in the presence of water to leave the calcium sulphate and the magnesium sulphate in an insoluble form and to change the potassium sulphate to a readily soluble form.

14. The process of producing potassium sulphate which consists in forming a mixture of uncalcined polyhalite and water; heating said mixture in a closed vessel for a time and at a temperature substantially of the range 200–210° C. to render the contained potassium sulphate readily extractible; and recovering the potassium sulphate.

15. The process of producing potassium sulphate which consists in forming a liquid mixture of uncalcined polyhalite, with such a quantity of water as will yield a final concentration of 7.5% potassium sulphate or less; heating said mixture in a closed vessel for a time and at a temperature substantially of the range 200–210° C. to render the contained potassium sulphate readily extractible; and recovering the potassium sulphate.

16. The process of producing potassium sulphate which consists in forming a liquid mixture of uncalcined polyhalite, with such a quantity of water as will yield a final concentration of 7.5% potassium sulphate or less, heating said mixture in a closed vessel for a time and at a temperature substantially of the range 200–210° C. to render the contained potassium sulphate readily extractible; and recovering the potassium sulphate.

17. The process of producing potassium sulphate which consists in forming a mixture of uncalcined polyhalite and water; heating said mixture in a closed vessel for an hour at a temperature of 200°–210° C. to render the contained potassium sulphate readily extractible; and recovering the potassium sulphate.

18. The process of extracting potassium sulphate from any of its compounds with calcium sulphate from which it can be extracted only with difficulty which consists in forming a mixture of the ground compound with a dilute solution of potassium sulphate; heating said mixture in a closed vessel to a temperature above 200° C. for a length of time to render the potassium sulphate extractible; and recovering the potassium sulphate.

19. The process of extracting potassium sulphate from any of its compounds with calcium sulphate from which it can be extracted only with difficulty which consists in forming a mixture of the ground compound with a dilute solution of potassium sulphate; heating said mixture in a closed vessel for substantially an hour to a temperature substantially of the range 200–210° C. to render the potassium sulphate extractible; and recovering the potassium sulphate.

EUGENE P. SCHOCH.